Oct. 19, 1943.                S. MINNECI                2,332,332
                           ELECTRIC CIRCUIT
                         Filed April 16, 1942
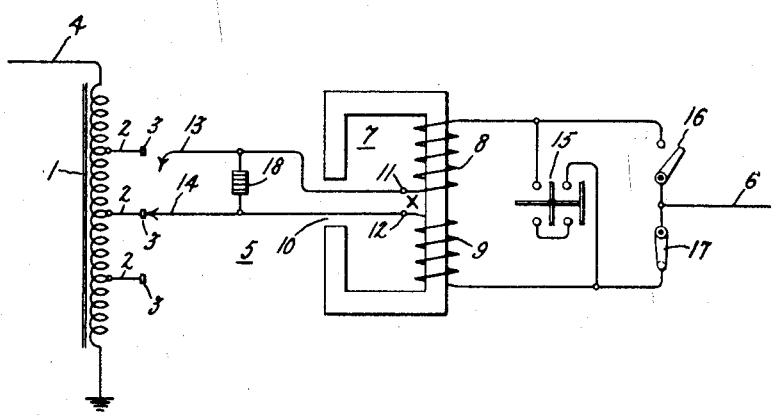
                                              Inventor:
                                         Salvatore Minneci,
                                         by  Harry E. Dunham
                                             His Attorney.

Patented Oct. 19, 1943

2,332,332

UNITED STATES PATENT OFFICE 2,332,332

ELECTRIC CIRCUIT

Salvatore Minneci, Pittsfield, Mass., assignor to General Electric Company, a corporation of New York Application April 16, 1942, Serial No. 439,155

7 Claims. (Cl. 171—119)

This invention relates to electric circuits and more particularly to improvements in load ratio control circuits.

"Load ratio control" as here used is the changing of the ratio of a transformer by means of taps while the transformer is under load without interrupting its load current. One class of such circuits includes a device some of whose species are known respectively as a preventive autotransformer, a mid-tap reactor, and a split reactor. This device is characterized by two windings on a common core, a terminal of each winding being selectively connectable to taps on the main transformer and the other terminal of each winding being connected to the same conductor of the main transformer circuit. In this manner the two windings are in parallel circuit relation with respect to the main transformer load current except when one winding is open-circuited and the two windings are in series circuit relation with respect to the tap-to-tap voltage of the main transformer. The load-current-produced magnetomotive forces in the coils oppose each other and the tap-to-tap-voltage-produced magnetizing currents in the coils produce magnetomotive forces which aid each other. The result is that the device has only leakage reactance (relatively low) with respect to the load current and has magnetizing reactance (relatively high) with respect to circulating or short-circuit current between adjacent main transformer taps.

In certain load ratio control circuits of the type using this device it is not possible permanently to interconnect the ends of its windings which connect to the main transformer circuit, as distinguished from the ends which connect to the main transformer taps. In other words, a so-called mid-tap reactor cannot be used per se, although such a device can readily be converted into a split reactor by opening its continuous winding at the mid-point and bringing out the physically adjacent leads. The present invention is concerned with load ratio control circuits of this last-mentioned variety and it is characterized by an improved split reactor arrangement having materially reduced voltage stresses and materially lowered insulation requirements and hence having a relatively low cost.

An object of the invention is to provide a new and improved electric circuit.

A further object of the invention is to provide a new and improved load ratio control circuit.

Another object of the invention is to provide an improved load ratio control circuit of the type utilizing a split reactor.

Still another object of the invention is to provide an improved arrangement and connection of the windings of a split reactor in a load ratio control circuit so as materially to reduce its voltage stresses, its insulation requirements and its cost.

A further object of the invention is to provide an improved split reactor type load ratio control circuit wherein means is provided for preventing the occurrence of electrostatically induced voltages on the reactor windings.

The invention will be better understood from the following description taken in connection with the accompanying drawing, and its scope will be pointed out in the appended claims.

Referring now to the single figure of the accompanying drawing, which illustrates diagrammatically an embodiment of the invention, there is shown therein a main transformer winding 1 provided with a plurality of taps 2 terminating in fixed tap contacts 3. The winding 1 may be the primary, secondary, tertiary, etc. winding of a conventional insulated multi-winding transformer or it may be an autotransformer winding. The latter arrangement is shown by way of example, and in order to simplify the showing of the circuits a ground return is used. Permanently connected to one terminal of the winding is a conductor 4, while adjustably connectable to the winding by means of a load ratio control circuit 5 is a circuit conductor 6. Either the circuit of conductor 4 to ground or the circuit of conductor 6 to ground may be considered the input or exciting circuit.

The load ratio control circuit comprises a split reactor 7 consisting of similar windings 8 and 9 on a common core which is provided with an air gap 10 for decreasing the magnetizing reactance of either one of the windings alone when the load ratio control circuit is in its so-called quarter-cycle position, as will be explained more fully hereafter. The windings 8 and 9 are preferably single-layer windings and, as shown, they are mounted side by side in non-overlapping relation on the core. In other words, the arrangement is the same as if the windings 8 and 9 were a continuous winding except that the connection is broken at the mid-point and the adjacent terminals or leads are brought out of the winding. These leads are shown respectively at 11 and 12 and they are connected respectively to movable ratio adjusting contacts or contact fingers 13 and 14. These movable ratio adjuster contact fingers and the tap contacts 3 constitute ratio adjusting switches.

These ratio adjusting switches are of the low-resistance low-pressure non-arcing duty type so that they may be mounted inside the main transformer tank, if desired, and underneath the surface of the cooling and insulating liquid in which the transformer windings are usually submerged.

The arcing duty of a load ratio control circuit is performed by a switching arrangement comprising a multi-break arcing switch 15 and a pair of selector switches 16 and 17. The latter two switches are connected respectively between the main circuit conductor 6 and the outermost or most widely spaced terminals of the split reactor. The arcing duty switch 15 is connected across the two switches 16 and 17 in series.

For preventing the occurrence of electrostatically induced voltages on the windings 8 and 9 during certain conditions or positions of the load ratio control circuit, a high resistance 18 is connected between the center leads 11 and 12 of the reactor. This resistor is preferably of the negative resistance-voltage characteristic type, one suitable form of which is described and claimed in Patent 1,822,742, granted September 8, 1931 on an application of K. B. McEachron and assigned to the assignee of the present application.

The operation of the illustrated embodiment of the invention is as follows: The ratio adjusters 13 and 14 have been illustrated in their so-called quarter-cycle position which is characterized by having one of them open-circuited, in this particular case it being the adjuster 13. Consequently, all of the transformer load current goes through the ratio adjuster 14, the half 9 of the split reactor and the closed switch 17 in series. This produces a voltage drop in the winding 9 which is proportional to the magnetizing reactance of this winding and in order to limit the value of this reactance so as to limit the voltage across the winding, especially under short-circuit conditions on the main circuit, the airgap 10 is provided in the core of the split reactor. Except for the voltage drop in this winding, the voltage of the circuit 6 will correspond to the voltage of the tap to which the ratio adjuster 14 is connected.

If it is desired to change the voltage ratio of the transformer 1, the ratio adjuster 13 may be moved either into engagement with the tap to which the ratio adjuster 14 makes connection or it may be moved into engagement with an adjacent tap contact. The former position is known as the full-cycle position and the latter position is known as the half-cycle or bridging position. After the ratio adjuster 13 has been moved so as to establish either one of these two positions the arcing switch 15 is first closed and then the main current carrying switch 16 is closed. In both the full- and half-cycle positions the load current of the transformer 1 is divided substantially equally between the two halves 8 and 9 of the split reactor and as the coils are wound in the same direction, whereas the currents flow in opposite directions, the magnetizing effects of the load currents oppose each other so that the voltages across the windings 8 and 9 due to the load current are proportional only to the leakage reactances of these windings. Heretofore, this leakage reactance has been made very low by interlacing the winding 8 and 9 but this is expensive and requires costly insulation because of the closeness of the turns and terminals of the windings. As the magnetizing reactance of one winding in the quarter-cycle position of the ratio adjusters represents the limiting case so far as voltage drop in the reactor is concerned, I have found that it is unnecessary to take special steps to reduce the leakage reactance of the windings and that if these windings are simple single-layer windings mounted side by side in non-overlapping relation on the core, as would be the case if they were a continuous winding which had been opened at the middle, their individual leakage reactances will in no case exceed their individual magnetizing reactances.

In the full-cycle position the voltage of the circuit 6 corresponds to the voltage of the tap to which the two ratio adjusters are connected and in the half-cycle position the voltage of the circuit 6 corresponds to the voltage mid-way between the two taps to which the ratio adjusters 13 and 14 are connected. The reactor 7, therefore, acts as an autotransformer in the half-cycle position for giving a voltage half-way between the voltage of the two adjacent taps.

Prior to moving either ratio adjuster from the full-cycle position or the half-cycle position to the quarter-cycle position, the corresponding selector switch 16 or 17 in series therewith is first opened. This causes all of the current which previously flowed through the open switch to flow through the other selector switch and then to flow through the arcing duty switch 15. The arcing duty switch 15 is then opened thereby to interrupt the current through the ratio adjuster which is to be moved into open-circuit position. In this manner a single arcing duty switch performs the current interruption for both of the ratio adjusters. This particular feature is covered broadly in Patent 2,112,064, granted March 22, 1938 on an appliaction of L. F. Blume and assigned to the assignee of the present application, and an improvement thereof forms the subject matter of Patent 2,246,182, granted June 17, 1941 on an application of A. Palme and O. P. McCarty except that in those patents the arcing duty switch is only a single break switch. The present multi-break switch increases the current rupturing ability of the circuit.

It will be noted that with the particular connection of the halves of the split reactor shown in the drawing the maximum voltage stress which can be produced directly by the circuit at the break X between the windings 8 and 9 is the tap-to-tap voltage of the main winding 1. Thus, following around from terminal 12 through ratio adjuster 14 and through the winding 1 to an adjacent tap contact, which is the only one to which the ratio adjuster 13 can be connected other than to the same contact to which the ratio adjuster 14 is connected, and then through the ratio adjuster 13 to the terminal 11 it will be seen that the maximum voltage which can be impressed across X will be the tap-to-tap voltage. It is, therefore, relatively easy and inexpensive to insulate the terminals 11 and 12 for this relatively low voltage.

It should be noted that this result would not follow if the connections of the windings 8 and 9 were reversed; that is to say, if the terminals 11 and 12 were connected to the switches 16 and 17 and if the end terminals of the windings 8 and 9 were connected to the ratio adjusters. Under these conditions the voltage of one or the other of the windings 8 or 9 will be added to the tap-to-tap voltage to produce the voltage across the break X and as under short-circuit conditions the voltages of the reactor windings may be relatively high the cost of insulating the break X would be much higher with the latter connection.

It will be observed that in the quarter-cycle position of the ratio adjusters either the winding 8 or the winding 9, as the case may be, is isolated from the circuit because one end is open-circuited by the ratio adjuster and the other end is open-circuited by the arcing duty switch 15 in combination with one or the other of the selector switches 16 and 17. It has been found that as a result of this isolation of the reactor windings they sometimes acquire by electrostatic induction relatively high voltage charges so that when the ratio adjuster switch to which they are connected first closes not only will there be a slight arc which is objectionable but also objectionable voltage surges may be produced in the main winding. In order to eliminate this, I permanently interconnect windings 8 and 9 by means of a high resistance 18. Preferably, the resistor is connected across the break X as this is the point of minimum normal voltage difference between the two windings. For preventing the accumulation of electrostatic charges an ordinary linear resistor is satisfactory. I have found, however, that if the resistor is made of the negative resistance-voltage characteristic material described and claimed in the above-mentioned McEachron patent still further protection is obtained in case of accidental over-voltages resulting from short circuit currents or surges in the system.

While there has been shown and described a particular embodiment of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is,

1. In combination, a tapped transformer winding, a pair of non-arcing duty ratio adjuster switches for cooperation therewith, a split reactor having one terminal of each of its halves connected to a different ratio adjuster switch, the two halves of said reactor being mounted side by side in non-overlapping relation on a common core with the terminals which are connected to said ratio adjusters being closest to each other, a circuit for said winding, and arcing duty switching means for selectively connecting the other terminals of said reactor halves to the same side of said circuit and disconnecting them therefrom.

2. In combination, a tapped transformer winding, a pair of non-arcing duty ratio adjuster switches for cooperation therewith, a split reactor having one terminal of each of its halves connected to a different ratio adjuster switch, the two halves of said reactor being mounted side by side in non-overlapping relation on a common core with the terminals which are connected to said ratio adjusters being closest to each other, a circuit for said winding, arcing duty switching means for selectively connecting the other terminals of said reactor halves to the same side of said circuit and disconnecting them therefrom, and a high resistance permanently interconnecting said reactor halves.

3. The combination as set forth in claim 1 in which said resistor has a negative resistance voltage characteristic and is connected between the terminals of said reactor halves which are connected to said ratio adjuster switches.

4. In combination, a magnetic core provided with an airgap, a winding on said core opened at its electrical center and leads brought out from the ends of the adjacent turns of its halves at the center, a main transformer provided with taps, a pair of non-arcing duty ratio adjuster switches cooperating with said taps and selectively movable between full-cycle positions in which they both make connection to the same tap and half-cycle positions in which they respectively make connection to adjacent taps by passing through intermediate quarter-cycle positions in which one switch is transferring its connection from one tap to an adjacent tap, said leads being connected respectively to said switches, a circuit for said main transformer, and arcing duty switching means for selectively connecting the terminals of said winding to the same side of said circuit.

5. In combination, a magnetic core provided with an airgap, a winding on said core opened at its electrical center and leads brough out from the ends of the adjacent turns of its halves at the center, a main transformer provided with taps, a pair of non-arcing duty ratio adjuster switches cooperating with said taps and selectively movable between full-cycle positions in which they both make connection to the same tap and half-cycle positions in which they respectively make connection to adjacent taps by passing through intermediate quarter-cycle positions in which one switch is transferring its connection from one tap to an adjacent tap, said leads being connected respectively to said switches, a circuit for said main transformer, arcing duty switching means for selectively connecting the terminals of said winding to the same side of said circuit, and a resistor whose impedance value is relatively very high in comparison with the impedance of said transformer and winding connected between said leads.

6. In combination, a magnetic core having a straight portion, a single-layer winding mounted on said straight portion whereby the physical spacing between the terminals of said winding is a maximum, said winding being opened at its center and leads brought out from the adjacent ends of its halves whereby the physical spacing between the inner ends of said halves is small in comparison to the spacing between said terminals, a main transformer provided with a plurality of tabs, a pair of non-arcing ratio adjuster switches cooperating with said taps and selectively movable between full-cycle positions in which they both make connection to the same tap and half-cycle positions in which they respectively make connection to adjacent taps by passing through intermediate quarter-cycle positions in which one switch is transferring its connection from one tap to an adjacent tap, said leads being connected respectively to said switches, a cicuit for said main transformer, and arcing-duty switching means for selectively connecting the terminals of said winding to the same side of said circuit.

7. In combination, a magnetic core having a straight portion, a single-layer winding mounted on said straight portion whereby the physical spacing between the terminals of said winding is a maximum, said winding being opened at its center and leads brought out from the adjacent ends of its halves whereby the physical spacing between the inner ends of said halves is small in comparison to the spacing between said terminals, a main transformer provided with a plurality of taps, a pair of non-arcing ratio adjuster switches cooperating with said taps and selectively movable between full-cycle positions in which they both make connection to the same tap and half-cycle positions in which they respectively make connection to adjacent taps by passing through intermediate quarter-cycle positions in which one switch is transferring its connection from one tap to an adjacent tap, said leads being connected respectively to said switches, a circuit for said main transformer, arcing duty switching means for selectively connecting the terminals of said winding to the same side of said circuit, and a high resistance permanently interconnecting said leads.

SALVATORE MINNECI.